(No Model.) 2 Sheets—Sheet 1.

C. M. GONNE.
HOLDBACK.

No. 589,826. Patented Sept. 14, 1897.

Witnesses.
Fred White
Thomas F. Wallace

Inventor.
Charles Melvill Gonne,
By his Attorneys.

(No Model.) 2 Sheets—Sheet 2.

C. M. GONNE.
HOLDBACK.

No. 589,826. Patented Sept. 14, 1897.

Witnesses.
Fred White
Thomas F. Wallace

Inventor.
Charles Melvill Gonne,
By his Attorneys

UNITED STATES PATENT OFFICE.

CHARLES M. GONNE, OF GORING, ENGLAND.

HOLDBACK.

SPECIFICATION forming part of Letters Patent No. 589,826, dated September 14, 1897.

Application filed April 6, 1897. Serial No. 630,976. (No model.)

*To all whom it may concern:*

Be it known that I, CHARLES MELVILL GONNE, of Goring, in the county of Oxford, England, have invented certain new and useful Improvements in or Relating to Breeching for Horses, of which the following is a specification.

My invention has reference to breeching for horses. Hitherto the breeching has usually been attached to the horse and has, in fact, formed part of the harness. Now according to my invention the breeching forms part of the vehicle instead of being attached to the horse.

For the purpose of my invention I make the breeching of a rod or bar of iron or other suitable material bent at the middle into the form of the ordinary leather breeching and turned back at the ends, so as to fit into sockets or the like on the shafts. The angle at which the ends are turned back or shaped, so as to fit into the sockets, will depend upon the height of the shafts relatively to the proper height for the breeching.

Figure 1:
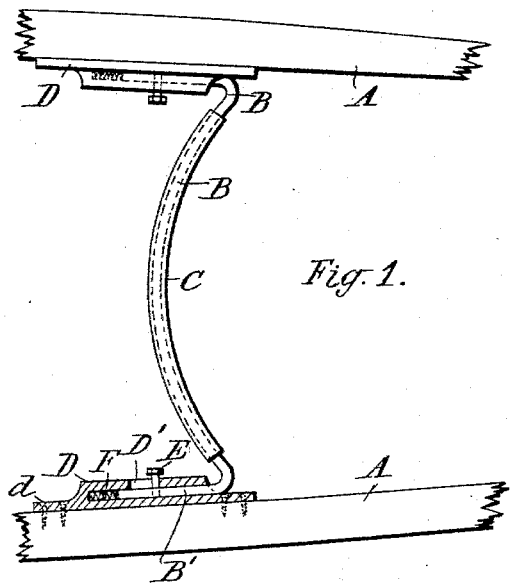
Figure 8:
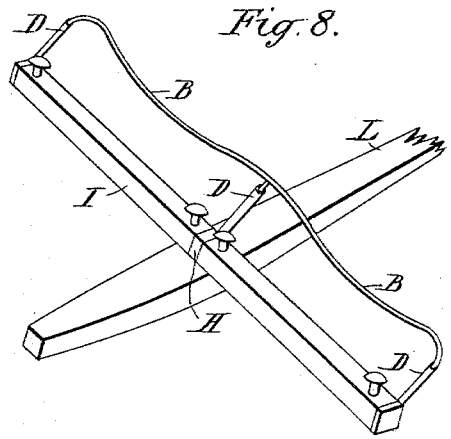
Figure 3:
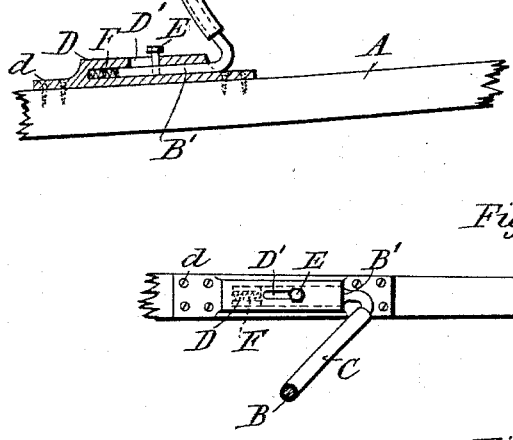
Figure 2:
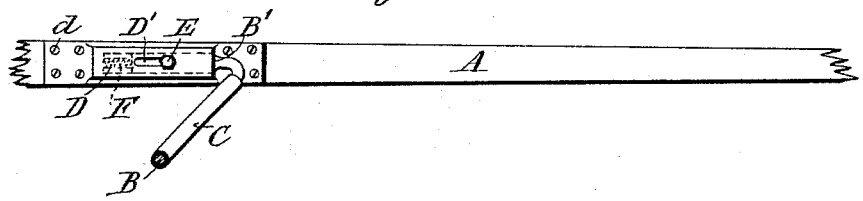
Figure 4:
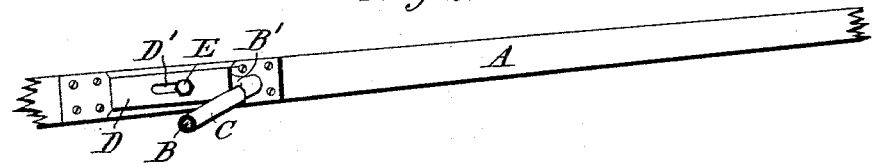
Figure 6:
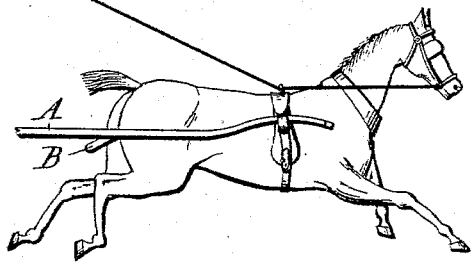
Figure 5:
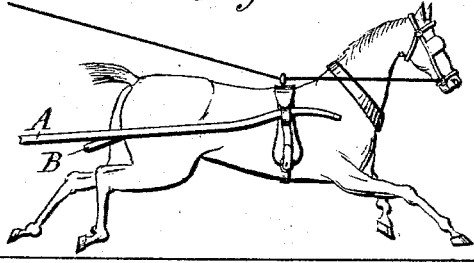
Figure 7:
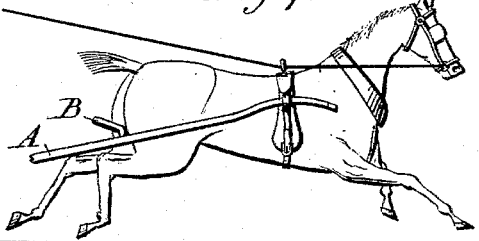

In the accompanying drawings, which illustrate the way in which my invention may be carried out, Figure 1 is a plan view, partly in horizontal section, of my improved breeching as applied to a one-horse vehicle. Figs. 2, 3, and 4 are side elevations corresponding to Fig. 1 and with the breeching proper in section, illustrating three different shapes of the breeching to suit shafts of many different heights. Figs. 5, 6, and 7 are views, on a smaller scale, corresponding to Figs. 2, 3, and 4, showing a horse harnessed in shafts of as many different heights relatively to the proper height for the breeching. Fig. 8 is a perspective view, on a smaller scale than that of Figs. 1, 2, 3, and 4, but larger than that of Figs. 5, 6, and 7, of my improved double breeching as applied to a two-horse vehicle.

Referring to Figs. 1 to 7, A A are the shafts of a one-horse vehicle, to which the improved breeching is to be applied. B is the improved breeching, which consists of a rod or bar B, of iron or other suitable material, bent at the middle, as shown, into the form of an ordinary leather breeching, and preferably covered at the actual breeching portion with india-rubber tubing, leather, or other soft material C, so as to avoid chafing or otherwise hurting the hind quarters of the horse. The breeching B is turned back at its ends B' B', which are approximately parallel to the shafts A A, and fit into sockets D D, that are attached by means of screws $d$ to the shafts. The sockets D D are formed with slots D', through which project studs or pins E, screwed into the respective ends B' of the breeching B. These studs E, by striking against the ends of the slots D', act as stops to limit the range of movement of the breeching in the forward and rearward directions. The sockets D are preferably fitted at the rear ends with spiral springs F for the purpose of preventing jar when the horse backs upon the breeching.

In order to have the actual breeching B at the proper height for breeching, the ends B' B' must be tilted or bent up or down to suit the relative heights of the shafts and the proper position for the breeching B. Thus in a dog-cart, for example, (illustrated by Figs. 2 and 5,) the shafts A A are generally at almost the height that the breeching B ought to be, so that the ends B' B' only require to be bent up to a slight extent, as shown.

In a hansom-cab (illustrated by Figs. 3 and 6) the shafts A A are much higher than the proper position for the breeching. Consequently the ends B' B' have to be bent up to a considerable extent, as shown in the figures, while in a four-wheel cab, where the shafts are much lower than the proper position for the breeching, the ends B' B' must be bent down considerably in order to meet the sockets D D on the shafts A A.

Fig. 8 illustrates the arrangement which I prefer to employ in a two-horse vehicle and which consists of a single bar bent into the form of a double breeching B B. The outer ends B' B' of the double breeching B B are attached to sockets D D on the respective ends of the splinter-bar I. The double breeching B B is further supported at its center by means of a socket H, fixed at the center of the splinter-bar I. L is the pole.

What I claim, and desire to secure by Letters Patent, is—

1. A breeching for horses consisting of a rearwardly-sliding rod or bar bent at the middle into the form of ordinary leather breeching and slidingly secured to the vehicle and not attached to the horse or horses, and a rearwardly-yielding connection between said breeching and vehicle, substantially as set forth.

2. In combination with a vehicle, a rearwardly-movable rod or bar extending across the front of the vehicle and curved to serve as a breeching, and having turned-back rigid ends tilted at a suitable angle, and sockets on the vehicle receiving, and movably and removably holding, said ends substantially as set forth.

3. In combination with a vehicle, a rod or bar extending across the front of the vehicle and curved to serve as a breeching, and having turned-back ends, sockets on the vehicle to receive said ends, slots in said sockets, retaining-studs screwed into the said turned-back ends and projecting through said slots, and springs in the said sockets to receive the impact of the turned-back ends of the breeching, substantially as set forth.

In witness whereof I have hereunto signed my name in the presence of two subscribing witnesses.

CHARLES M. GONNE.

Witnesses:
ROBERT B. HANDLEY,
W. E. MANTIUS.